(12) United States Patent
Durand et al.

(10) Patent No.: US 6,746,557 B2
(45) Date of Patent: Jun. 8, 2004

(54) BEAD LOADING METHOD AND APPARATUS

(75) Inventors: Jean-Marie Durand, Luxembourg (LU); Douglas Raymond Weaver, Uniontown, OH (US); Francis Cornet, Habay-la-Vieille (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 264 days.

(21) Appl. No.: 09/957,740

(22) Filed: Sep. 21, 2001

(65) Prior Publication Data

US 2003/0056874 A1 Mar. 27, 2003

(51) Int. Cl.[7] ............................................... B29D 30/32

(52) U.S. Cl. ...................... 156/111; 156/131; 156/133; 156/396; 156/403

(58) Field of Search ................................ 156/131, 135, 156/133, 111, 396, 403

(56) References Cited

U.S. PATENT DOCUMENTS

| | | | |
|---|---|---|---|
| 1,818,955 A | | 8/1931 | Maas |
| 1,964,363 A | * | 6/1934 | Ostling et al. ............... 156/111 |
| 2,319,643 A | | 5/1943 | Sternad et al. |

(List continued on next page.)

FOREIGN PATENT DOCUMENTS

| | | | |
|---|---|---|---|
| DE | 42 23 584 | 8/1993 | |
| EP | 0105048 | 4/1984 | |
| EP | 0 303 197 | 2/1989 | |
| JP | 62-130832 A | * 6/1987 | ................. 156/131 |
| JP | 63116839 | 5/1988 | |

OTHER PUBLICATIONS

U.S. patent application Ser. No. 09/957,731, LeMaire et al., filed Sep. 21, 2001.

(List continued on next page.)

Primary Examiner—Geoffrey L. Knable
(74) Attorney, Agent, or Firm—Howard M. Cohn

(57) ABSTRACT

A method for mounting beads on a tire carcass which is being laid up on tire building drum, particularly applicable to cases wherein the drum has a free end and an opposite end which is supported by a drum support (or comparable impediment to installing a bead from the opposite end of the drum). The method comprises disposing a first of two beads on the drum in an area which is between a carcass layup area and the drum support. The bead is moved into this position from the free end of the drum, and this is done before the process of laying up the carcass has resulted in there being an impediment to installing the bead from the free end of the drum, such as bumps resulting from tire insert components. This may be prior to any carcass components have been laid up, or after an inner liner has been laid up, or after an inner liner and inserts and a ply have been laid up on a drum having pockets (recesses) to alleviate bump formation. With the bead "parked" on the drum, yet out of the way of laying up the carcass, the carcass may be laid up. After laying up the carcass the bead is moved into position on the carcass. Then, additional tire components may be laid up on the tire carcass and/additional steps performed in the formation of the carcass. The other bead is installed onto the carcass in a conventional manner. In this manner, both beads may be installed from a one free end of a drum. A bead loading system includes a rail, two carriers hanging from the rail, and a bead holder at the end of each carrier. In a flexible, automatic tire building system having a sequence of work stations, after a completed carcass is removed from a drum at a last one of the workstations, a first bead for a subsequent carcass can be placed onto the drum at the last workstation, before the drum is re-circulated to the first work station.

20 Claims, 9 Drawing Sheets

U.S. PATENT DOCUMENTS

| | | | |
|---|---|---|---|
| 2,407,152 A | * 9/1946 | Haase | 156/111 |
| 2,818,907 A | 1/1958 | Sapp | |
| 3,318,745 A | 5/1967 | Black et al. | |
| 4,293,358 A | * 10/1981 | Loeffler et al. | 156/131 |
| 4,604,158 A | 8/1986 | Broyles | |
| 4,684,422 A | 8/1987 | Roedseth et al. | |
| 4,753,707 A | 6/1988 | Crombie | |
| 5,144,626 A | 9/1992 | Funatsu et al. | |
| 5,322,587 A | * 6/1994 | Kondo et al. | 156/401 |
| 5,354,404 A | 10/1994 | Benjamin | |
| 5,411,626 A | 5/1995 | Coretta et al. | |
| 5,554,242 A | 9/1996 | Brown et al. | |

OTHER PUBLICATIONS

U.S. patent application Ser. No. 09/960,078, LeMaire et al., filed Sep. 21, 2001.

U.S. patent application Ser. No. 09/957,785, Zeh et al., filed Sep. 21, 2001.

* cited by examiner

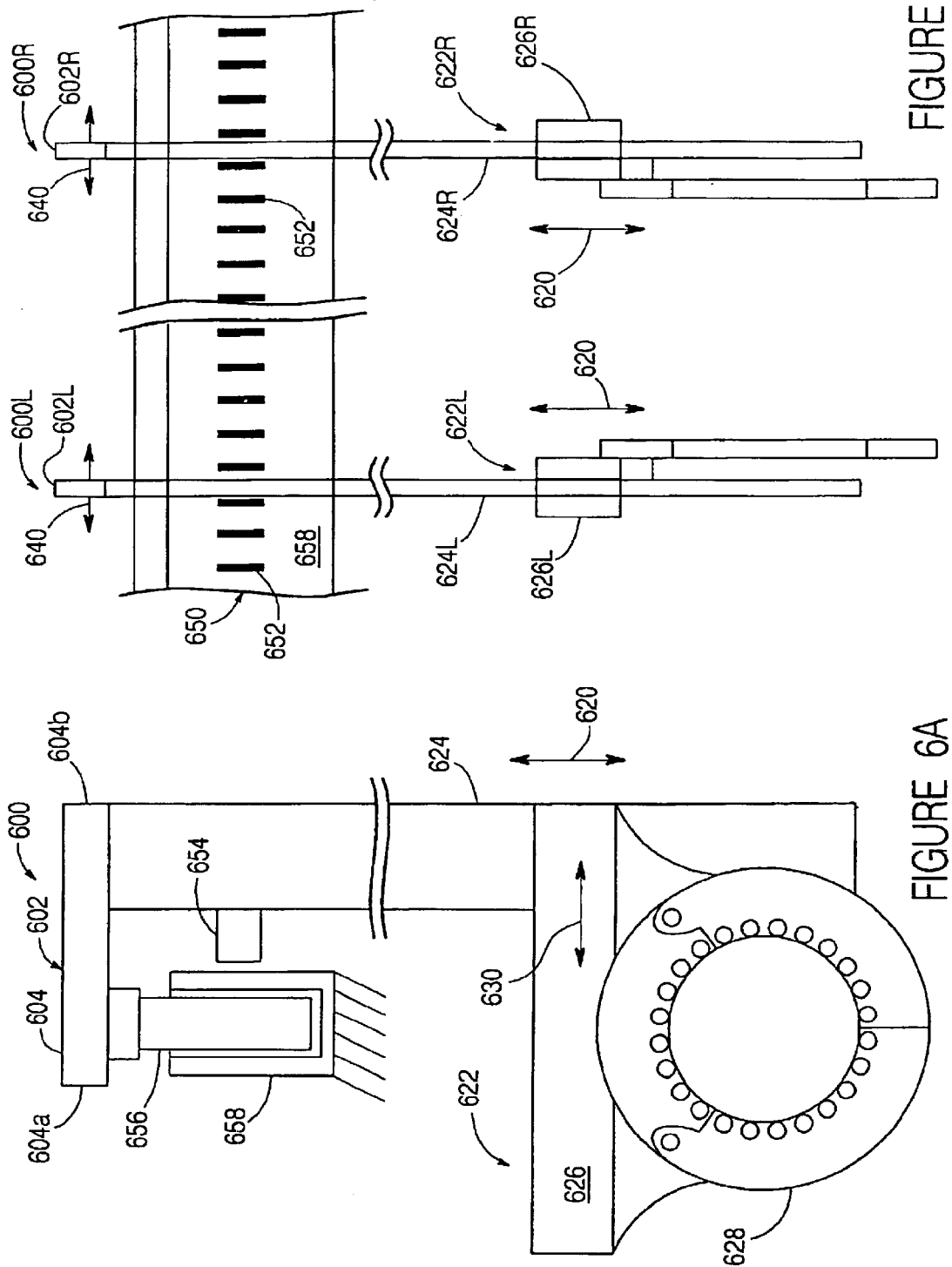

BEAD LOADING METHOD AND APPARATUS

CROSS-REFERENCE TO RELATED APPLICATIONS

This application relates to U.S. patent application Ser. No. 09/957,731 entitled PRECISION LONGITUDINAL REGISTRATION OF TIRE BUILD DRUM TO FMS WORK STATION, and filed on an even date herewith.

This application relates to U.S. patent application Ser. No. 09/957,785 entitled METHOD FOR MANUFACTURING TIRES ON A FLEXIBLE MANUFACURING SYSTEM, and filed on an even date herewith.

This application relates to U.S. patent application Ser. No. 09/960,078 entitled PRECISION ALIGNMENT OF TIRE BUILDING DRUM TO AUTOMATED TIRE BUILDING SYSTEM WORKING AXIS, and filed on an even date herewith.

This application relates to U.S. patent application Ser No. 09/960,215 entitled EXPANDABLE TIRE BUILDING DRUM WITH ALTERNATING FIXED AND EXPANDABLE SEGMENTS, AND CONTOURS FOR SIDEWALL INSERTS, and filed on an even date herewith.

TECHNICAL FIELD OF THE INVENTION

The present invention relates to building tires and, more particularly, to methods and apparatus for loading beads on green tire carcasses, particularly in the context of an automatic tire building system having a sequence of work stations, and also in cases that the carcass has bumps resulting from insert components and the like.

BACKGROUND OF THE INVENTION

It is known that in making vehicle tires, for example for automobiles, that manufacture of a so-called carcass is first achieved by successively assembling several different components. In other words, the different carcass types included in a production range can be distinguished from one another depending on the presence thereon of the various accessory components and/or the typology of the accessory components themselves.

By way of example, when carcasses for tubeless tires are to be produced, that is tires that in use do not require the presence of an inner tube, the main components can be considered to include a so-called inner liner that is a layer of elastomeric air-impervious material, a carcass ply, a pair of annular metal elements, commonly referred to as bead cores (or simply "beads"), around which the opposite ends of the carcass ply are folded, as well as a pair of sidewalls made of elastomeric material, extending over the carcass ply at laterally opposite positions. The accessory components may in turn comprise of one or more additional carcass plies, one or more reinforcing bands for overlying the carcass ply or plies at the areas turned up around the bead cores (chafer strips), and others.

As disclosed in U.S. Pat. No. 5,554,242, two stage tire building with a first stage tire building drum in combination with a second stage tire building drum is well known and established in the art with the building drums being both in line and offset from each other. It is further known to have two-stage tire building with a single drum swinging between the first stage position and second stage position where a band builder is in line with the first stage building drum. For this system, individual breaker application and single piece tread rubber are applied at the second stage while components such as apex chafers and shoulder wedges are applied at the first stage. The above components are made in separate operations and stored for use as needed in the two-stage building process.

U.S. Pat. No. 5,354,404 discloses a system for assembling green tires with a two stage process where the assembly is automatic and requires a small amount of floor space.

It has been known in the prior art, as disclosed in U.S. Pat. No. 2,319,643, to manufacture tires on a line with a plurality of building drums that are chucked up at each station.

Also, as disclosed in U.S. Pat. No. 1,818,955, tires can be manufactured on a line with a plurality of building drums "arranged in a train or series and connecting means is provided for translating the cores from one device to the next." The connectivity between the tire cores leads to the inability to change the machine to accommodate various sized tire constructions.

In modern production processes, the assembling of the different components is carried out in automated plants including a plurality of assembling drums moved following a precise working sequence in accordance with the manufacturing process to be executed. For example, as disclosed in U.S. Pat. No. 5,411,626, these plants can consist of a plurality of work stations disposed consecutively in side by side relation, each of which lends itself to carry out the application of a predetermined component onto the assembling drums that in turn are brought in front of it.

EPO 0,105,048 discloses a tire assembly means employing a conveyor to transport a plurality of tire building drums to a plurality of applicator stations wherein various components are applied to the tire building drums at the various applicator stations in order to fabricate a tire when the tire building drums have made a complete transversal of the conveyor, wherein the tire building drums are maintained in an angled relationship with respect to the conveyor and the applicator stations.

In particular there are primary work stations intended for application of the main components, which are always active, irrespective of the carcass type being produced. Alternated with the various primary work stations there are one or more auxiliary, work stations, intended for application of accessory components, if required. The activation or deactivation state of these auxiliary stations depends on the carcass type in progress of manufacture.

Typical tire building machines comprise a tire build drum around which the tire components are wrapped in successive layers including, for example, an innerliner, one or more carcass plies, optional sidewall stiffeners and bead area inserts (e.g., apex), sidewalls and bead wire rings (beads). After this layering, the carcass ply ends are wrapped around the beads, the tires are blown up into a toroidal shape, and the tread/belt package is applied. Typically the tire build drum is in a fixed location on the plant floor, and the various layers of components are applied manually or automatically using tooling registered to reference points on the fixed drum in order to ensure component placement with the desired degree of precision. The tooling is generally fixed relative to the tire build drum, for example a guide wheel on an arm extending from the same frame (machine base) which supports the tire build drum.

SUMMARY OF THE INVENTION

According to the invention, a method is provided for mounting two beads on a tire carcass which is being laid up on tire building drum, wherein the drum has a free end and an opposite end which is supported by a drum support (or comparable impediment to installing a bead from the opposite end of the drum), and the drum has a first area on its surface where the tire carcass will be laid up. The method comprises disposing a first of the two beads on the drum in an area which is between the carcass layup area and the drum support. The bead is moved into this position from the free end of the drum, and this is done before the process of laying up the carcass has resulted in ihere being bumps in the outer surface of the tire carcass. This may be prior to any carcass components have been laid up, or after an inner liner has been laid up, or after an inner liner and inserts and a ply have been laid up on a drum having pockets (recesses) to alleviate bump formation. With the bead "parked" on the drum, yet out of the way of laying up the carcass, the carcass may be laid up. After laying up the carcass the bead is moved into position on the carcass. Then, additional tire components may be laid up on the tire carcass and/additional steps performed in the formation of the carcass. The other bead is installed onto the carcass in a conventional manner. In this manner, both beads may be installed from a one free end of a drum.

The present invention is particularly useful in conjunction with a system for simultaneously building a plurality of tire carcasses, such as is disclosed in the aforementioned U.S. patent Application Ser. No. 09/957,785 entitled METHOD FOR MANUFACTURING TIRES ON A FLEXIBLE MANUFACURING SYSTEM, and described hereinbelow with respect to FIGS. 1A, 1B, 1C, 1D and 2. The method disclosed therein generally comprises the tire building steps of establishing a sequence of at least three and up to ten work stations; advancing at least three disconnected tire building drums along a working axis extending through the at least three work stations; and applying one or more tire components to the tire building drums at each of the work stations. Then the resulting green tire carcass is removed at the last of the work stations. Finally, the tire building drum is advanced from the last work station after the green carcass has been removed to the first work station.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Figure 1A:
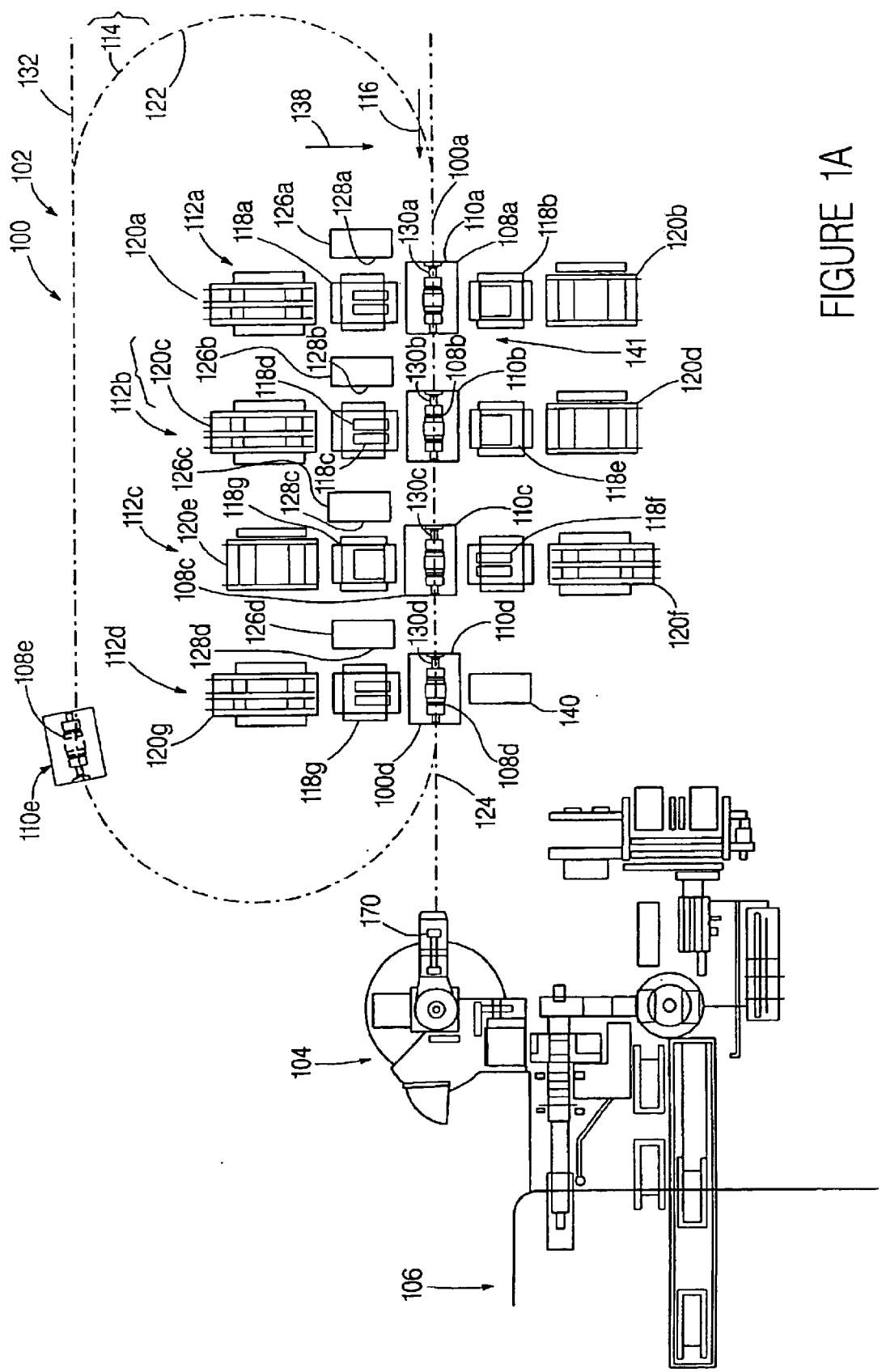

Elements of the figures are typically numbered as follows The most significant digit (hundreds) of the reference number corresponds to the figure number. Elements of FIG. 1 are typically numbered in the range of 100–199. Elements of FIG. 2 are typically numbered in the range of 200–299. Similar elements throughout the drawings may be referred to by similar reference numerals. For example, the element 199 in a figure may be similar, and possibly identical to the element 299 in another figure. Elements of the figures can be numbered such that similar (including identical) elements may be referred to with similar numbers in a single drawing. For example, each of a plurality of elements collectively referred to as 199 may be referred to individually as 199a, 199b, 199c, etc. Or, related but modified elements may have the same number but are distinguished by primes. For example, 109, 109', and 109" are three different elements which are similar or related in some way, but have significant modifications, e.g., a tire 109 having a static imbalance versus a different tire 109' of the same design, but having a couple imbalance. Such relationships, if any, between similar elements in the same or different figures will become apparent throughout the specification, including, if applicable, in the claims and abstract. Sometimes, similar elements are referred to with the suffixes -L and -R (e.g., 133L, 133R), which generally indicate left and right, as may be viewed in the drawing. Such elements may be referred to collectively simply by their number (e.g., 133) with no L/R suffix.

Figure 1B:
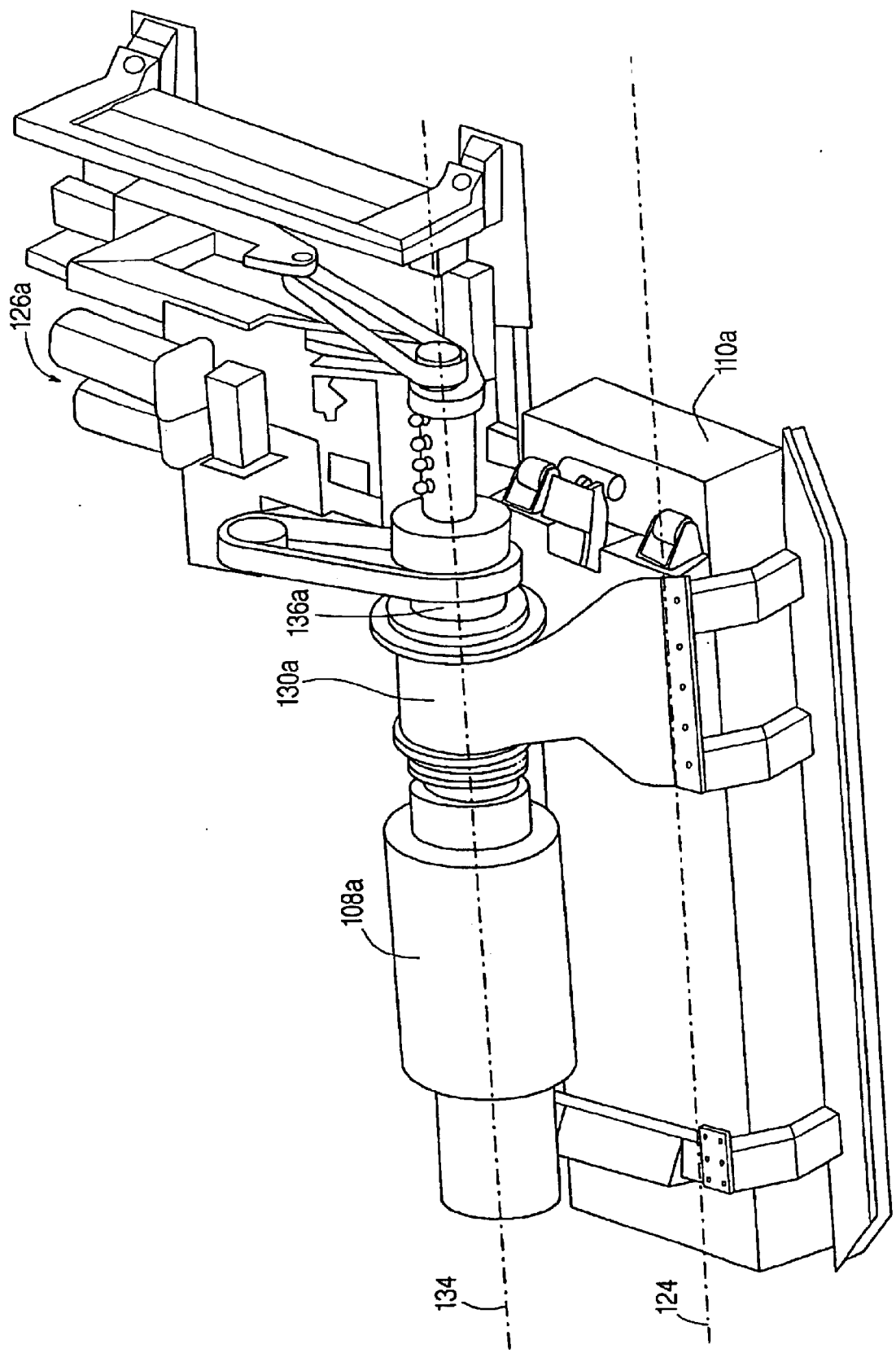
Figure 1C:
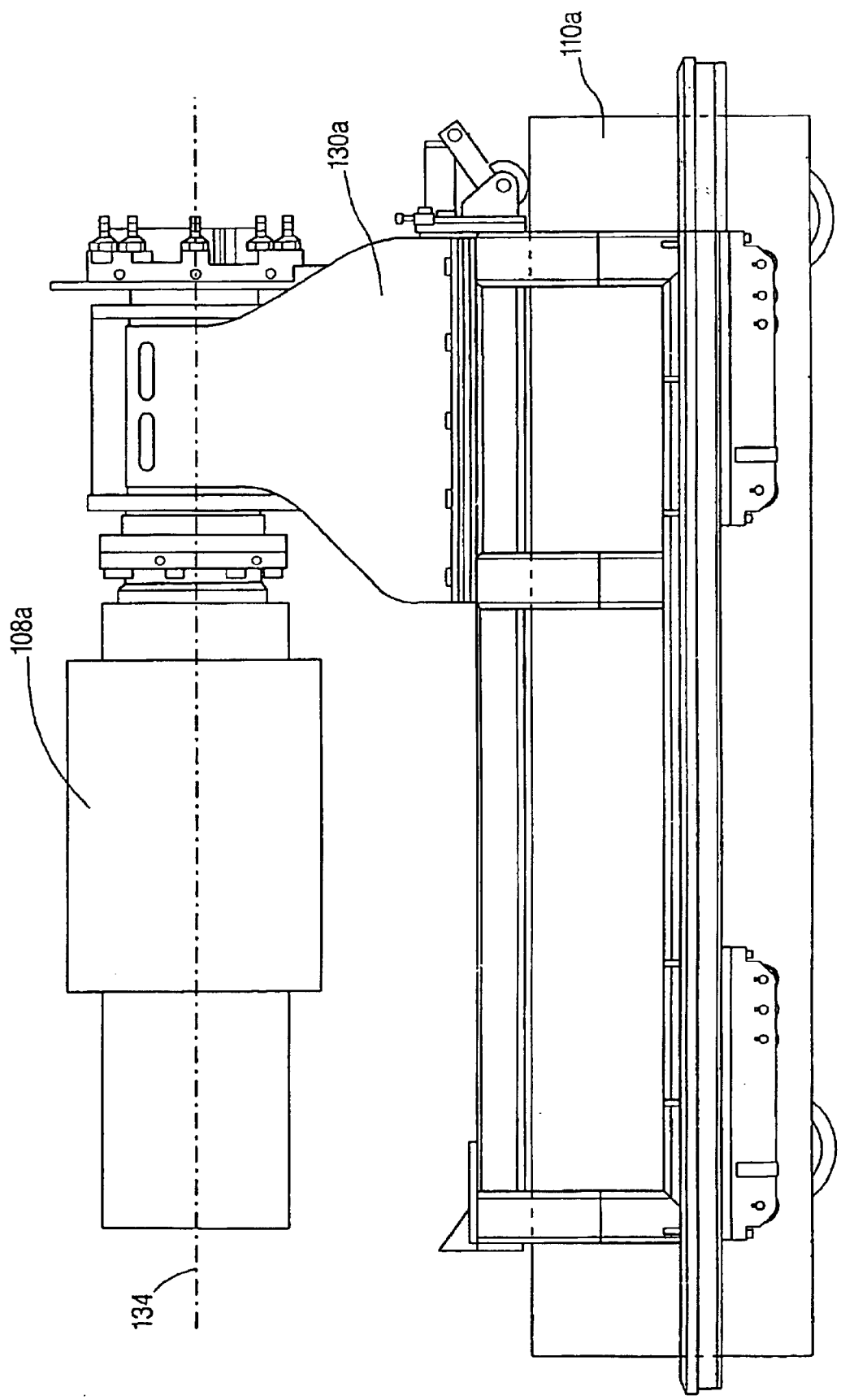
Figure 1D:
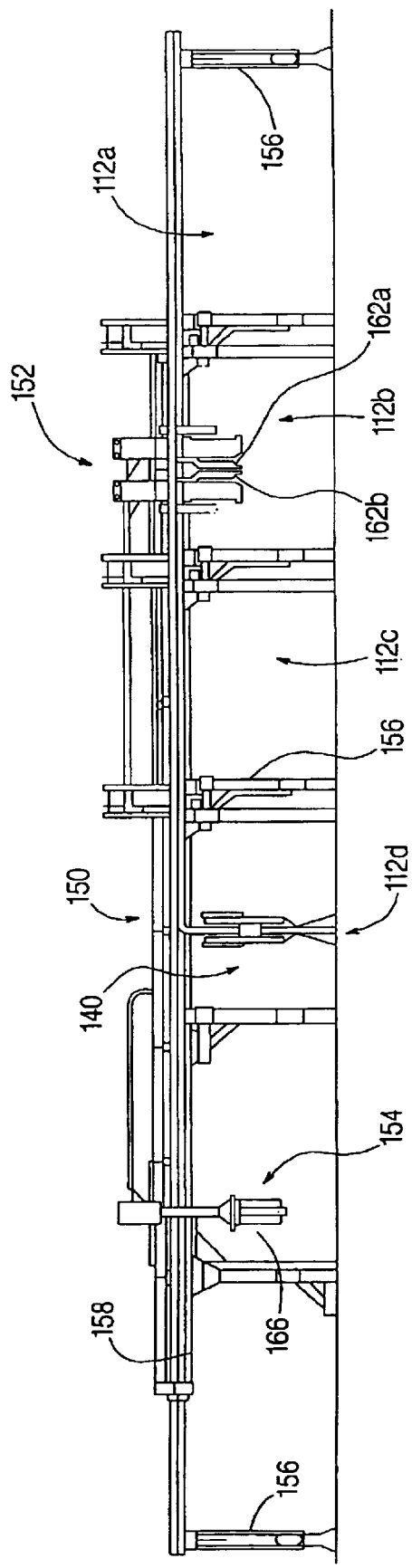
Figure 2:
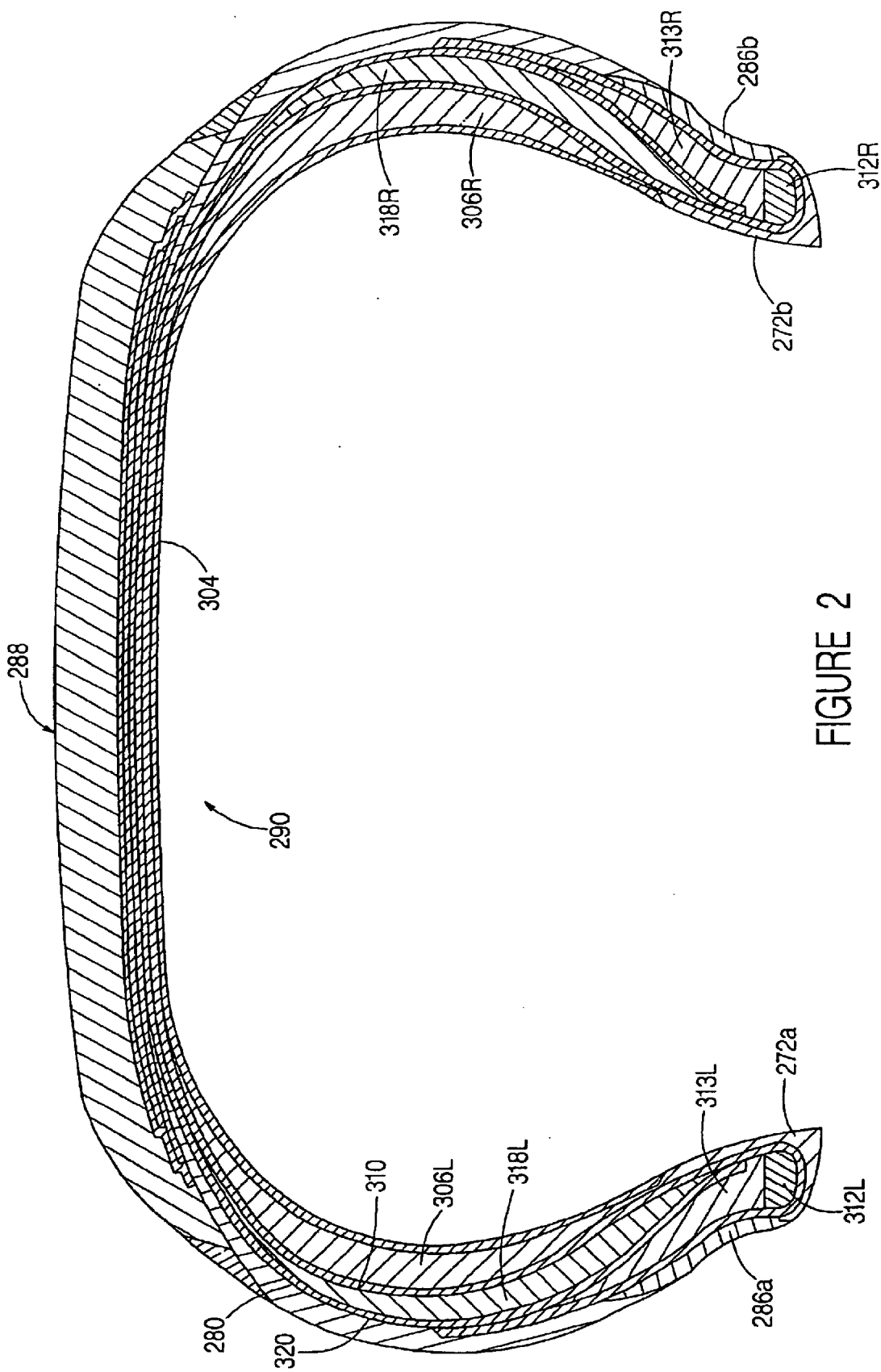
Figure 3A:
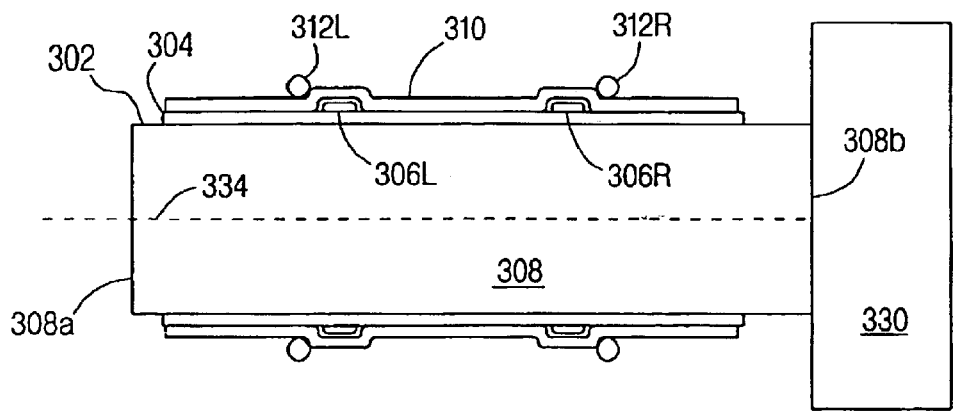
Figure 3B:
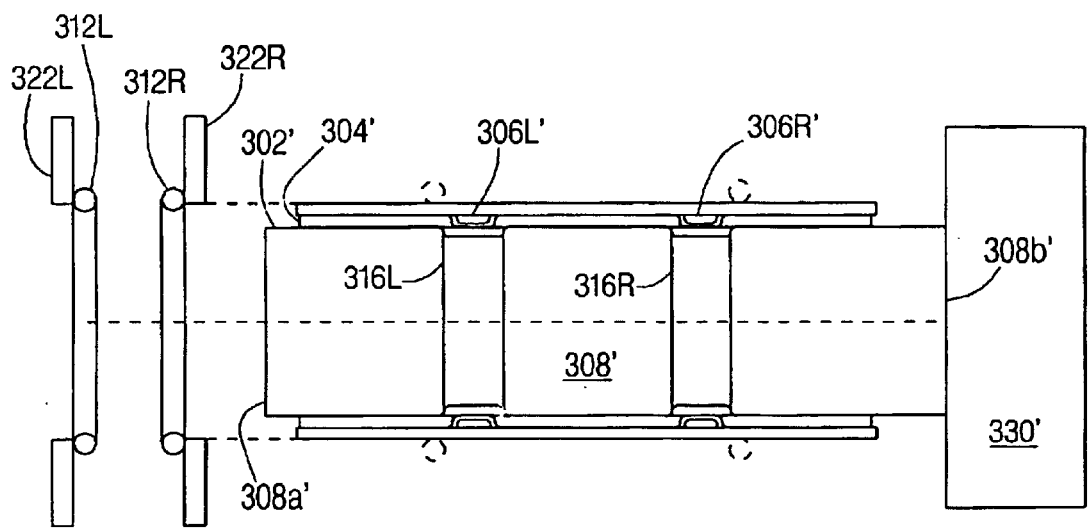
Figure 3C:
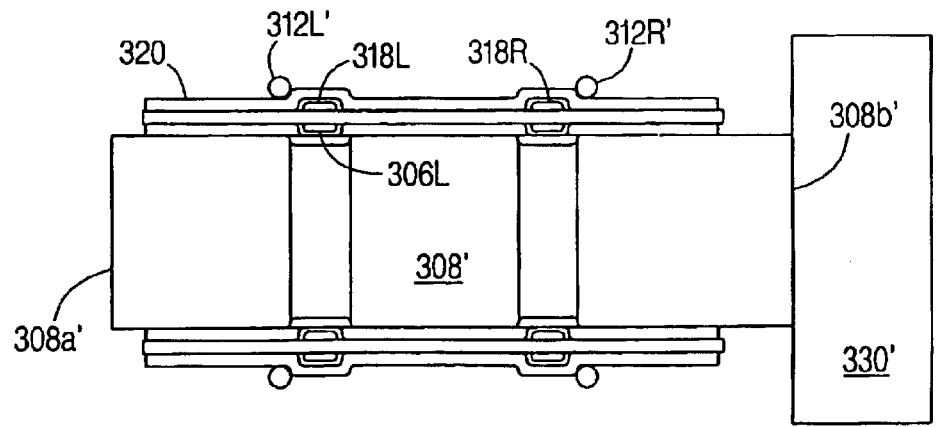
Figure 4A:
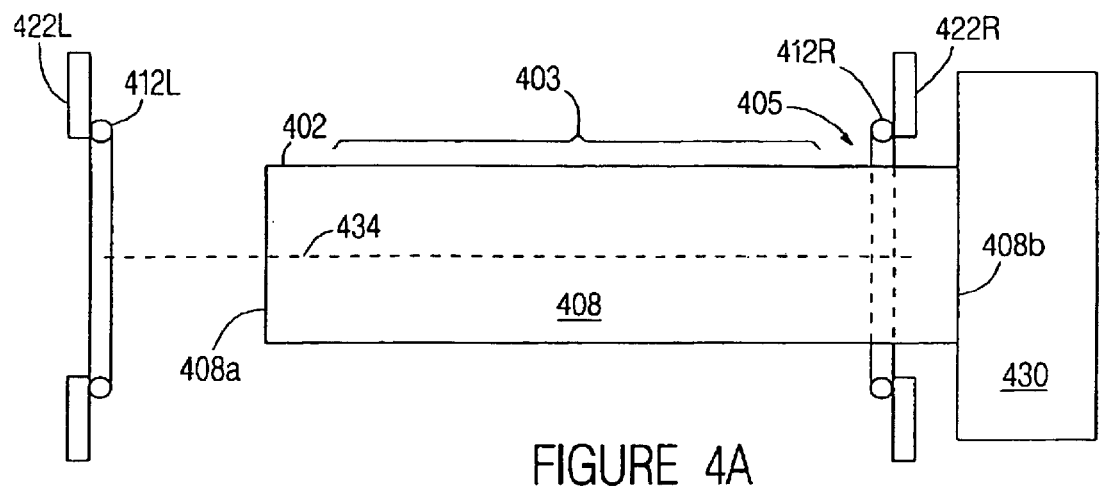
Figure 4B:
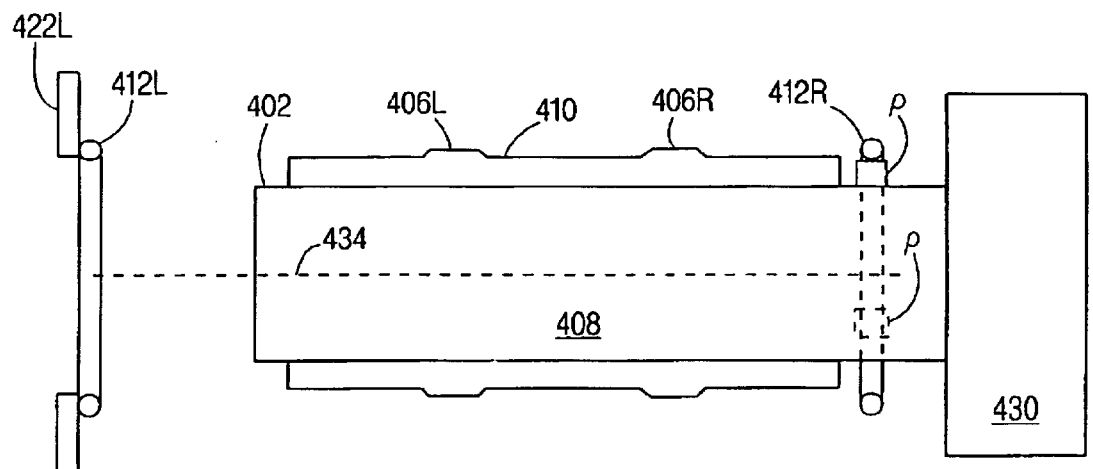
Figure 4C:
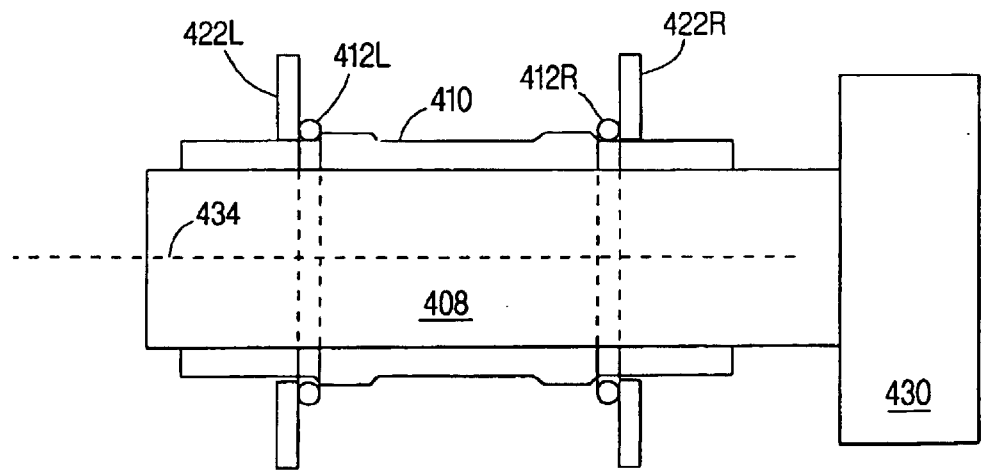
Figure 5A:
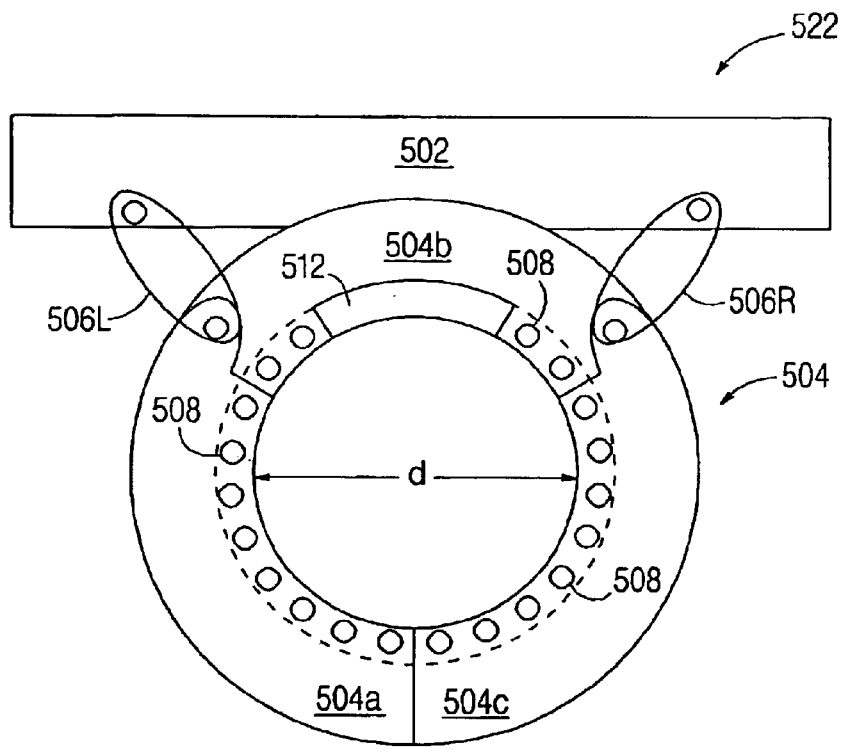
Figure 5B:
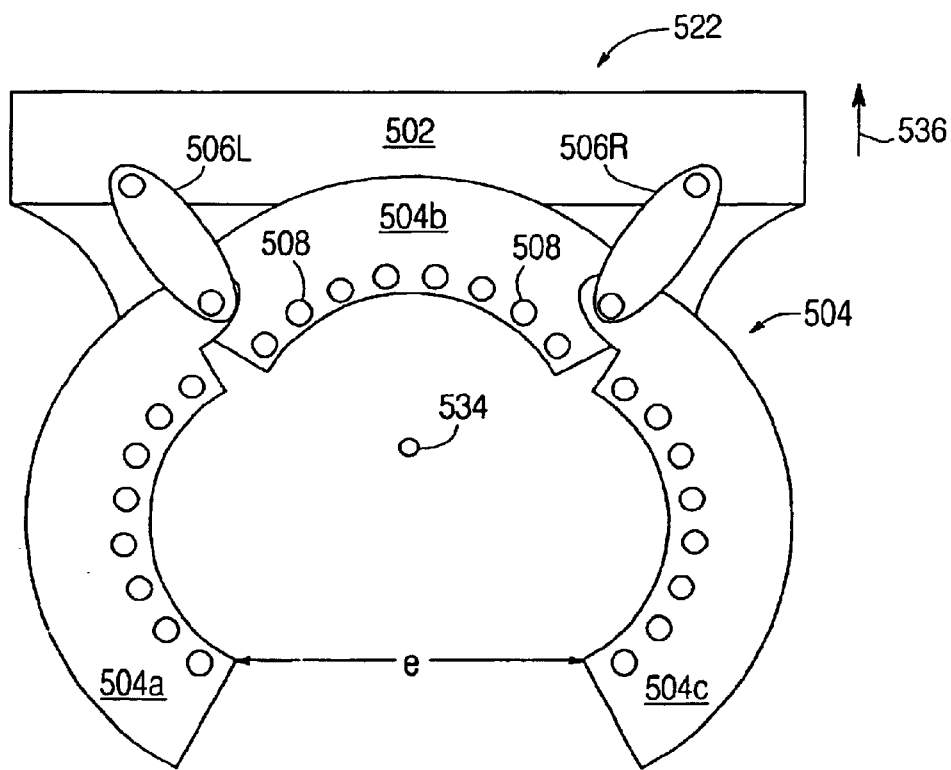

The structure, operation, and advantages of the present preferred embodiment of the invention will become further apparent upon consideration of the following description taken in conjunction with the accompanying drawings, wherein:

FIG. 1A is a schematic view of a flexible, automatic tire building system, according to the invention;

FIG. 1B is a perspective view of a workstation of the flexible, automatic tire building system, showing a tire build drum coupled to an intake station, according to the invention;

FIG. 1C is a side view of a tire build drum on a drum support frame, according to the invention;

FIG. 1D is a schematic view an overhead structure incorporating a bead loading system, a bead loading system and a carcass transfer apparatus used in conjunction with the automated tire building machine of FIG. 1A;

FIG. 2 is a cross-sectional view of a typical runflat tire construction that can be produced with the flexible, automatic tire building system of FIG. 1;

FIG. 3A is a cross-sectional view of a tire building drum, with a tire carcass being laid up thereupon;

FIG. 3B is a cross-sectional view of a tire building drum, with a tire carcass being laid up thereupon;

FIG. 3C is a cross-sectional view of a tire building drum, with a tire carcass being laid up thereupon;

FIG. 4A is a cross-sectional view of a tire building drum, with a tire carcass being laid up thereupon, according to an initial step in a method of the present invention;

FIG. 4B is a cross-sectional view of a tire building drum, with a tire carcass being laid up thereupon, according to a further step in the method of the present invention;

FIG. 4C is a cross-sectional view of a tire building drum, with a tire carcass being laid up thereupon, according to a further step in the method of the present invention;

FIG. 5A is a schematic plan view of a prior art bead setter which would be useful (but not necessary) in practicing the method of the present invention, in a closed position;

FIG. 5B is a schematic plan view of the bead setter of FIG. 5A, in the open position.

FIG. 6A is a front view of a carrier, according to the invention; and

FIG. 6B is a side view of two carriers of the type in FIG. 6A, according to the invention.

DEFINITIONS

The following terms may be used throughout the descriptions presented herein and should generally be given the following meaning unless contradicted or elaborated upon by other descriptions set forth herein.

"Apex" (also "Bead Apex") refers to an elastomeric filler located radially above the bead core and between the plies and the turnup plies.

"Axial" and "axially" refers to directions that are on or are parallel to the tire's axis of rotation.

"Axial" refers to a direction parallel to the axis of rotation of the tire.

"Bead" refers to that part of the tire comprising an annular substantially inextensible tensile member, typically comprising a cable of steel filaments encased in rubber material.

"Belt structure" or "reinforcement belts" or "belt package" refers to at least two annular layers or plies of parallel cords, woven or unwoven, underlying the tread, unanchored to the bead, and having both left and right cord angles in the range from 18 to 30 degrees relative to the equatorial plane of the tire.

"Breakers" or "tire breakers" refers to a belt or belt structure or reinforcement belts.

"Carcass" refers to the tire structure apart from the belt structure, tread, undertread over the plies and the sidewalls, but including the beads, plies, and, in the case of EMT or runflat tires, the wedge inserts sidewall reinforcements.

"Casing" refers to the carcass, belt structure, beads, sidewalls and all other components of the tire excepting the tread and undertread.

"Chafer" refers to reinforcing material (rubber alone, or fabric and rubber) around the bead in the rim flange area to prevent chafing of the tire by the rim parts.

"Chipper" refers to a narrow band of fabric or steel cords located in the bead area whose function is to reinforce the bead area and stabilize the radially inwardmost part of the sidewall.

"Circumferential" refers to circular lines or directions extending along the perimeter of the surface of the annular tread perpendicular to the axial direction, and can also refer to the direction of sets of adjacent circular curves whose radii define the axial curvature of the tread, as viewed in cross section.

"Cord" refers to one of the reinforcement strands, including fibers or metal or fabric, with which the plies and belts are reinforced.

"Crown" or "tire crown" refers to the tread, tread shoulders and the immediately adjacent portions of the sidewalls.

"EMT tire" refers to Extended Mobility Technology and EMT tire refers to a tire which is a "runflat", which refers to a tire that is designed provide at least limited operational service under conditions when the tire has little to no inflation pressure.

"Equatorial plane" refers to a the plane perpendicular to the tire's axis of rotation and passing through the center of its tread, or midway between the tire's beads.

"Gauge" refers generally to a measurement, and often to a thickness dimension.

"Inner liner" refers to the layer or layers of elastomer or other material that form the inside surface of a tubeless tire and that contain the inflating gas or fluid within the tire. Halobutyl, which is highly impermeable to air.

"Insert" refers to the crescent-shaped or wedge-shaped reinforcement typically used to reinforce the sidewalls of runflat-type tires; it also refers to the elastomeric non-crescent-shaped insert that underlies the tread; it is also called a "wedge insert."

"Lateral" refers to a direction parallel to the axial direction.

"Meridional profile" refers to a tire profile cut along a plane that includes the tire axis.

"Ply" refers to a cord-reinforced carcass reinforcing member (layer) of rubber-coated radially deployed or otherwise parallel cords.

"Pneumatic tire" refers to a laminated mechanical device of generally toroidal shape (usually an open-torus) having two beads, two sidewalls and a tread and made of rubber, chemicals, fabric and steel or other materials.

"Shoulder" refers to the upper portion of sidewall just below the tread edge.

"Sidewall" refers to that portion of a tire between the tread and the bead.

"Tire axis" refers to the tire's axis of rotation when the tire is mounted to a wheel rim and is rotating.

"Tread cap" refers to the tread and the underlying material into which the tread pattern is molded.

"Turn-up end" refers to a portion of a carcass ply that turns upward (i.e., radially outward) from the beads about which the ply is wrapped.

DETAILED DESCRIPTION OF THE INVENTION

As shown in FIG. 1A, there is disclosed a flexible, automatic tire building system 100 that includes a first stage tire building system 102, a carcass transfer device 104 and a second stage building system 106. As described in greater detail below, a tire carcass is built on each of a plurality of tire building drums 108a, 108b, 108c, 108d, 108e (collectively referred to as "108") as they advance through the first stage building system 102. Concurrently, with the building of the tire carcass on each tire building drum 108, a belt package covered with a tread is built at the second stage building machine 106. The transfer device 104 removes each tire carcass from the tire building drum 108 in the first stage building system 102. The belt package is place over the carcass and the latter is blown up to form a green tire.

There are a number of advantages achieved by the flexible, automatic tire building system 100. First, tire building system 100 can be easily and quickly modified to include more or less work stations depending on the complexity of the tire being built. Also, the configuration and number of tire building drums can be changed to accommodate the building of tires of different sizes and constructions. Further, the drums that apply the material to the building drums can be easily modified to accommodate different sized materials depending on the particular construction of the tires being built. These and other improvements will be discussed in detail below.

As shown in FIG. 1A, the first stage building system 102 incorporates a sequence of at least three and up to ten work stations, such as stations 112a, 112b, 112c, 112d (collectively referred to as "112"), for applying one or more tire components onto the tire building drums 108 at each of the work stations. Individual, self propelled devices typically called automated guided vehicles (AGVs) 110a, 110b, 110c, 110d, 110e (collectively referred to as "110") each having one of the building drums 108 attached thereto, are used to advance the building drums through the first stage building system 102. The tire build drums 108 are rotatably supported by a drum support 130a, 130b, 130c, 130d, 130e (collectively referred to as "130"), respectively, which in turn mounts to its respective AGV 110. The tire build drums 108 rotate with respect to the drum support 130 about an axis of rotation 134. The AGVs 110 operate independently from each other and are not connected to each other and are remotely guided along a work path 114, shown as an oval loop. Also, the building drums 108, each mounted to an AGV, are not connected to each other. The work path 114 can have any desired configuration, as discussed in more detail below. The work path 114 includes a straight, linear working axis 124 extending through the work stations 112, in the direction of arrow 116. The AGVs 110 function to independently advance the disconnected tire building drums 108 around the work path 114 and specifically along the linear working axis 124 extending through the work stations 112 so that one or more tire components can be applied to the tire building drums at each station. Preferably, each of the AGVs 110 reach the work stations 112 at the same time. However, while it is not a necessary requirement that the AGVs 110 reach the work stations at the exact same time, it is important that the AGVs do not collide with each other. For example, AGV 110a reaches station 112a, at the same time that AGVs 110b, 110c, 110d reach work stations 112b, 112c, 112d, respectively. Because of the extra distance along the loop of the working path 114 from the last work station 112d to the first work station 112a, as compared to the distance between the other work stations, i.e., 112a to 112b, an additional AGV 100e with building drum 108e, as shown in FIG. 1A, can be provided to increase the speed of the movement of the building drums 108 around the working path.

Each work station 112 includes application drums 118a, 118b, 118c, 118d, 118e, 118f, 118g (collectively referred to as "118"), supply reels 120a, 120b, 120c, 120d, 120e, 120f, 120g (collectively referred to as "120"), and intake servers 126a, 126b, 126c, 126d (collectively referred to as "126"), respectively.

The intake servers 126 at each work station 112 are normally in a retracted position, as shown in FIG. 1A, spaced back from the working axis 124. When a tire building drum 108 is initially advanced to a work station 112 by an AGV 110, the intake server 126 moves outward in the direction of arrow 138 across the working axis 124 and couples to that tire build drum 108 then disposed at that work station. The intake servers 126 function to provide power to control and operate the tire building drums 108. In addition, the coupling of the intake server 126 to the tire building drum 108 establishes a precise, longitudinal position for the tire build drum with respect to the intake server 126. In addition, the axis of revolution 134 of the building drums 108 are maintained parallel to the axis of rotation 123 through the application drums 118 when the building drums are located in the work station 112. The longitudinal positioning of the building drums 108 occurs without changing the location of the axis of rotation 134 through the building drums 108 which is maintained at a constant predetermined height and location and in parallel alignment with the working axis 124. Preferably, the axis of rotation 134 through the building drums 108 is co-linear with the working axis 124 as the building drums are advanced through and between the first and last work stations 112a to 112d, respectively. After the tire building component(s) are applied to the tire building drum, as discussed in more detail hereinafter, the intake servers 126 are uncoupled from the building drums 108 and returned to their retracted position, as shown in FIG. 1A, so that the AGVs 110 can continue their movement, unrestricted, along the work path 114.

The axis of rotation 123 through application drums 118 are precisely aligned vertically and horizontally to the working axis 124. This ensures that when the application drums 118 move inward toward the building drums 108, when the later are in the work station, the tire building component will be precisely applied to the building drums as discussed hereinafter. Also, the application drums 118 are precisely positioned longitudinally along the working axis 124 relative to a longitudinal reference point 128a, 128b, 128c, 128d (collectively referred to as "128"), established for each work station 112, such as for example, the longitudinal reference point 128 on a forward surface of the intake servers 126. The application drums 118 are normally disposed away from the working axis 124 so that the AGVs 110 can pass each of the work stations 112 in the first stage building system 102 without contacting the application drums.

After the tire building drums 108 are positioned longitudinally along the working axis 124 relative to a longitudinal reference point 128a, 128b, 128c, 128d (collectively referred to as "128") established for each work station 112, the application drums 118 can move forward towards the working axis 124 so that the tire component previously applied on the outer circumference of the application drum, as discussed hereinafter, is pressed against the outer circumferential surface of the tire building drums 108. Then, the rotation of the building drums transfers the tire component from the application drums 118 to the building drums 108. An important feature is that the tire components are applied to the tire building drums 108 while maintaining the axis of rotation 134 through the building drums at the constant predetermined height and location and in parallel co-linear alignment with the working axis 124.

Once the tire component is transferred onto the tire drum 108, the application drum 118 can with retract to its initial position so that the tire building drum can receive another tire component from an application drum on the opposite side of the working axis 124 or move onto the next work station 112. The application drums 118 can be of different constructions depending on the specific tire component being applied to the building drums 108. Typically, different tire components are applied at each work station 112 as the building drums 108 move through a sequence of steps beginning at the first work station 112a and ending at the last work station 112d, in the present configuration.

The supply reels 120 have tire components wound thereon and are disposed directly behind their respective application drums 118, as shown in FIG. 1A. Typically, a desired length of tire component can be unwound from a supply reel 120 and wound onto the outer circumferential surface of an adjacent application drum 118. Once the supply reel 120 is empty, another full reel can easily be brought into place so that the F flexible, automatic tire building system 100 continues to operate.

As illustrated in FIG. 1A, the preferred embodiment of the tire building system 100 incorporates a plurality of independently movable, self-powered AGVs 110, for individually advancing the tire build drums 108 carried on each between the work stations 112 in the direction shown by arrow 116. The AGVs 110, as shown in FIG. 1A, have the tire build drums 108 attached thereto by a drum support 130a, 130b, 130c, 130d (collectively referred to as "130"). The AGVs 110 follow the work path 114 defined by a guide wire 122 embedded in the plant floor. The work path 114, as shown in FIG. 1A, is an oval path passing through the work stations 112 from a first work station 112a to a last work station 112d, and then looping back around to the first work station 112a. The work stations 112 are aligned to and spaced along a common, linear working axis 124, which extends along the work path 114 from the first work station 112a to the last work station 112d. The AGV guide wire 122, which provides a control signal to the AGVs 110, is substantially parallel to the working axis 124 when the guide wire 122 passes through the work stations 112. While the work path 114 is shown as looping back in one direction, it is also possible to provide an additional loop (not shown) similar to the loop formed by work path 114 looping back on the opposite side of the automatic tire building system 100 from work path 114, as now shown. Moreover, there can be provided spurs 132 from the work path 114 onto which the AGVs 100 can be moved for service, storage, recharging or any other need. Although self-powered, and automated to follow the guide wire 122, the AGVs 110 are also subject to external control, for example by radio signal and/or proximity switches, so that the AGVs can be controlled to stop at each work station 112 for a suitable amount of time before proceeding to the next work station 112 or for moving them onto the spur 132 or to some other part of the factory floor as needed.

Referring to FIG. 1D, there is illustrated a view of an overhead structure 150 which incorporates a bead loading and bead setting system 152 and carcass transfer apparatus 154. The overhead structure 150 includes a plurality of support columns 156, disposed to provide space for the working stations 112a, 112b, 112c, 112d, as shown in FIG. 1A. A rail 158 is mounted to the support columns 156 and extends from the first work station to a distance past the last work station 112d.

The bead loading system 152 includes a pair of bead loaders 162a and 162b that move along the rail 158. The bead loading system 152 also includes a bead loader 140, as shown in FIG. 1D for mounting the beads onto the bead loaders 162a and 162b. The bead loaders 162a and 162b move along the rail 158 and place the beads onto the building drums 108 and also set the beads onto the building drums 108 moving through the first stage building system 102, as discussed in more detail herein below.

The carcass transfer apparatus 154 that moves along the rail 158 and includes a grab ring device 166 that slides onto and removes the finished tire carcass from the building drum 108 in working station 112d. The grab ring device 166 then moves toward the carcass transfer device 104 where the tread and belt package are placed over the tire carcass.

An exemplary sequence of operations for building a green tire carcass on a tire building system 100 is as follows. For the first step of a green tire carcass building process, the AGV 100a advances an empty tire build drum 108a along the working axis 124 so that an axis of rotation 134 through the building drum 108a is in parallel alignment with the working axis 124. Moreover, as the building drum 108a moves through working stations 112a–112d, the axis of rotation 134 through the building drum 108a is maintained at a constant, predetermined height so that an axis of rotation 134 through the building drum 108a is always at a constant predetermined location with the working axis 124 through the first stage machine 102. The building drum 108a advances into the first work station 112a and stops so that the building drum is approximately at a desired stopping point past the intake server 126a. Then, the intake server 126a moves outward in the direction of arrow 138 towards the working axis 124 until a coupling head 136a, 136b, 136c, 136d of the intake server, as shown in FIG. 1B is aligned with the drum support 130a. The coupling head 136a of intake server 126a next couples to the tire build drum 108a so that the build drum is in a precise longitudinal position along the working axis 124 while retaining the parallel alignment of the axis of rotation 134 with working axis 124.

In the preferred embodiment, power and control signals are communicated to/from the tire build drum 108 by the intake server 126.

Next the application drum 118b can move outward in the direction of arrow 141 towards the working axis 124 until the tire component, already unwound from a supply reel 120b onto the outer circumferential surface of the application drum, engages the outer circumferential surface of the tire building drum 108a. The building drum 108a then rotates so that the first layer of a tire component, such as an inner liner 304, is applied to the drum. Next, the application drum 118a is retracted to its initial position and the (double) application drums 118a move outward in the direction of arrow 138 toward the working axis 124 until a pair of toe guards 272a, 272b, already unwound from the (double) supply reels 120b, are pressed against the inner liner 304 already applied to the outer circumferential surface of the building drum 108a. The building drum 108a then rotates so that the toe guards 272a, 272b are applied to the inner liner 304 on the drum. Next, the application drum 118 is retracted to its initial position.

When the application processes are completed in workstation 112a, the intake server 126a releases the tire build drum 108a to the AGV 110a, uncouples and retracts to a position clear of the path of the AGVs 110 and tire build drums 108, thereby allowing the AGV 100a to advance the tire build drum 108a to the next work station 112b. In order to clear the way, all AGVs 110 present in workstations 112 must move approximately simultaneously. As previously mentioned, the AGVs 110 are not connected to each other and the building drums 108 are not connected to each other.

For the next step of the green tire carcass building process, the AGV 110a propels the tire build drum 108a into the second work station 112b whereupon operations similar to those described for the first work station 110a are performed. That is, the intake server 126b moves outward in the direction of arrow 138 towards the working axis 124 and couples to the tire build drum 108a so that the build drum is in precise alignment, as previously discussed. Then, in the construction of the exemplary runflat tire, the tire building drum is shaped to provide two pockets. Next the application drums 118c, 118d can move outward in the direction of arrow 138 towards the working axis 124 until tire insert components 306L, 306R, already unwound from supply reels 120c onto the outer circumferential surface of the application drums, engage the inner liner already applied to the outer circumferential surface of the tire building drum 108a, each above one of the pockets. The building drum 108a then rotates so that the tire inserts 306L, 306R are applied to the inner liner 304 already applied to the building drum. Next, the application drums 118c, 188d are retracted to their initial position and the application drum 118e move outward in the direction of arrow 141 toward the working axis 124 until a first ply component 310, already unwound from the supply reel 120d, is pressed against the inserts 306L, 306R and the inner liner 304 already applied to the outer circumferential surface of the building drum 108a. The building drum 108a then rotates so that the first ply component 310 is applied on the drum. Next, the application drum 118e is retracted to its initial position.

For the next step of the green tire carcass building process, the AGV 110a propels the tire build drum 108a into the third work station 112c whereupon operations similar to those described for the first and second work stations 112a and 112b are performed. That is, the intake server 126c moves outward in the direction of arrow 138 towards the working axis 124 until a coupling head of the intake server couples to the tire build drum 108a so that the axis of rotation 134 of the build drum is in precise alignment with working axis 124.

Next the application drums 118f can move outward in the direction of arrow 141 towards the working axis 124 until the second tire insert components 318R, 318L, already unwound from supply reels 120f onto the outer circumferential surface of the application drums, engage the first ply 310 already applied to the outer circumferential surface of the tire building drum 108a. The building drum 108a then rotates so that the second tire inserts 318R, 318L are applied to the first ply 310 already applied to the drum. Next, the application drums 118f are retracted to their initial position and the application drum 118g moves outward in the direction of arrow 138 toward the working axis 124 until a second ply component 280, already unwound from the supply reel 120e, is pressed against the second tire inserts 318R, 318L and the first ply 310 already applied to the outer circumferential surface of the building drum 108a. The building drum 108a then rotates so that the second ply component 320 is applied on the drum. Next, the application drum 118g is retracted to its initial position.

Further, at work station 112c, the building drum can be shaped again and a pair of beads 312L, 312R with apexes 313L, 313R are set with bead loaders 162a, 162b, and the apexes are stitched into place. Continuing, the under liner 304 and the overlying first ply 310 and second ply 320 are turned up over the beads 318R, 318L, using conventional turnup bladders (not shown). Depending on the construction, one of the beads can be placed onto the building drum 108 prior to placing the second inserts 318L, 318R onto the building drum. For example, one of the beads can be placed onto the building drum 108 after the tire carcass is removed from the building drum at the last station 112d.

Continuing, the AGV 110a advances the tire build drum 108a into the fourth work station 112d whereupon operations similar to those described for the first, second and third work stations 112a, 112b and 112c are performed. That is, the intake server 126d moves outward in the direction of arrow 138 towards the working axis 124 until a coupling head of the intake server coupes to the tire build drum 108a so that the axis of rotation 134 of the build drum is in precise alignment with working axis 124.

Next the application drums 118g can move outward in the direction of arrow 138 towards the working axis 124 until chafer and sidewall components 286a, 286b, already unwound from supply reels 120g onto the outer circumferential surface of the application drums, engage the second ply 280 already applied to the outer circumferential surface of the tire building drum 108a. The building drum 108a then rotates so that the chafer and sidewalls components 286a, 286b are applied into place directly over the location of the beads and stitched to the second ply to form a tire carcass. Next, the application drums 118g are retracted to their initial position.

Once the tire carcass is completed on the first stage building system 102, a carcass transfer mechanism 104 including a transfer ring 166, of the type disclosed in U.S. Pat. No. 4,684,422 removes the tire carcass from the building drum 108a at the last work station 112d and moves it onto a shaping turret 170 of the second stage machine 104.

Continuing, building drum 108a advances along the work path 114 from the last station 112d to the first station 112a while all the other drums are simultaneously advanced to the next station from their previous location.

A belt and tread package 288 are build at the machine 106. The belt and tread package 288 are transferred from the machine 106 onto the tire carcass now located on the shaping turret 170 of the second stage machine 104. The green tire carcass on the shaping turret 170n is inflated (reshaped) to a toroidal shape, and its radially-outer surface is pressed against a tread and belt package 288. In subsequent steps, the green carcass is stitched (rolled with a roller) to remove air pockets and adhere internal surfaces together. Then, the green tire carcass and tread and belt package are blown up to form a green tire 290. The green tire 290, as shown in FIG. 2, is removed from the transfer device 104 and sent, typically by a conveyor (not shown) to a mold (vulcanizing press) to cure under heat (typically 350 degrees Fahrenheit) and pressure to become a finished tire.

Tire Building Drum

FIG. 3A (compare FIGS. 1B and 1C) illustrates (in a greatly simplified manner) an exemplary first stage tire building drum 308 (compare 108). The drum 308 is generally cylindrical, having an axis of rotation 334 (compare 134), a cylindrical outer surface 302, a one end 308a and another, opposite end 308b. In a typical tire buildup, an inner liner 304 is applied on the surface 302 of the drum 308, and two tire insert components ("inserts") 306L and 306R (collectively referred to as "306") are disposed at longitudinally (axially) spaced apart positions on the inner liner 304, as shown. Next, a first ply 310 is disposed over the inner liner 304 and inserts 306 (as discussed hereinabove with regard to the system 100). This results in a green tire carcass having a nominally cylindrical shape. However, as is evident from the illustration of FIG. 3A, the addition of the inserts 306 between the inner liner 304 and the ply 310 causes there to be two "bumps", which are regions of increased outside diameter ("OD"), in the outer surface of the carcass.

Two beads 312L and 312R (collectively referred to as "312") are normally added to the tire carcass. Each bead 312 is a substantially inextensible circular hoop, having an inside diameter ("ID") which is substantially equal to or preferably only slightly greater than the OD of the ply 310 (in areas other than where there are bumps). The beads 312L and 312R are shown as being slightly axially outboard of the inserts 306, and are shown as having a round (versus hexagonal) cross-section for sake of illustrative clarity. A second ply (not shown) may be added to the carcass, and the outer end portions of the carcass may be turned up. Finally the carcass may be transferred by a carcass transfer device (104) to a second stage building machine (106) for adding the tread package, etc., as discussed hereinabove.

As is relevant to the present invention of loading beads on a tire carcass, the drum 308 may be supported at one end by a drum support 330 (compare 130). As mentioned hereinabove, in a flexible, automatic tire building system 100, self-propelled vehicles 110, each having a respective one of a plurality of building drums 108 attached thereto, are coupled to respective ones of the drum supports 130 and are used to advance (move) the building drums, from workstation-to-workstation, through the first stage building system 102 and, at an exemplary workstation (e.g., 112c), beads are applied. The drum 308 is shown as being supported at one end 308b by the drum support 330, and the other end 308a of the drum 308 is not supported ("free", "cantilevered").

Evidently, if the bumps caused by the inserts 306 are sufficiently high (which they typically are), it would not be feasible to mount the right-hand bead 312R by sliding it onto the drum 308 from the free end 308a thereof. And the drum support 330 prevents the right-hand bead 312R from being slid onto the drum 308 from the supported end 308b. There is, of course, no comparable problem sliding the left-hand bead 312L onto the drum 308 from the free end 308a thereof, since it need not be moved onto the carcass past the bump caused by the left insert 306L. The present invention provides a solution to this "bump" problem.

FIG. 3B illustrates an alternate embodiment of an exemplary first stage building drum 308' of the (compare 308) of the prior art. The drum 308' is generally cylindrical, having an axis of rotation 334' (compare 334), and a generally (versus nominally) cylindrical outer surface 302', and is supported at one end 308b' by a drum support 330' (compare 330). The other end 308a' of the drum 308' is not supported (or "free", or "cantilevered"). The drum 308' differs from the drum 308 of FIG. 3A primarily by virtue of having recesses (pockets) 316L and 316R (collectively referred to as "316") in its outer surface at longitudinal (axial) positions corresponding to the positions of and related to the dimensions of the inserts 306L' and 306R' (compare 306L and 306R). In this example, the inner liner 304' is applied to the surface of the drum 308'. Then the inserts 306 are applied, and down into the recesses 316. Then a ply 310' (compare 310) is applied. This results in a green tire carcass having a substantially cylindrical shape. In contrast to the tire carcass 310 formed in FIG. 3A, the addition of the inserts 306' between the inner liner 304' and the ply 310' does not cause there to be two "bumps" in the outer surface of the carcass 310'. Since there are substantially no bumps, and the outer surface of the tire carcass being laid up is substantially cylindrical, having a substantially uniform OD, it would be possible to mount two beads onto the carcass by sliding them on from the free end 308a of the drum 308'. Two beads 312L' and 312R' (collectively referred to as "312") are shown, each supported by a respective one of two bead holders (or loaders) 322L and 322R (collectively referred to as "322"). This is relevant to the present invention in that the two beads of a tire can be slid into position on a carcass from one end of a drum which has only one "free" end. The installed position of the beads 312L' and 312R' is shown in dashed lines on the ply 310', each being positioned slightly axially outboard of the respective inserts 306L' and 306R'.

FIG. 3C illustrates another example of building (laying up) a tire carcass on a tire drum, such as the drum 308' of FIG. 3B having recesses 316, the tire carcass having an inner liner 304', inserts 306', and a first ply 310'. In this example, a second set of inserts 318L and 318R (collectively referred to as "318") are added to the carcass, at longitudinal (axial) positions corresponding to the positions of the first set of inserts 306'. And a second ply 320 is added over the second inserts 318. This results in a situation similar to that described with respect to FIG. 3A, wherein the addition of inserts (in this case, inserts 318) causes bumps (regions of increased OD) in the outer surface of the nominally cylindrical tire carcass which can interfere with the mounting of the beads. In the manner of the tire carcass formed in FIG. 3A, the addition of the inserts 318 between the first ply 310' and the second ply 320 causes there to be two "bumps" in the outer surface of the carcass, making it impossible to mount the right-hand bead 312R' by sliding it onto the drum from the free end 308a' of the drum 308'. As in the previous example, there would be no problem sliding the left-hand bead 312L' onto the drum 308' from the free end 308', since is does not have to traverse (pass by, or over) a bump.

Method of Mounting Beads on a Tire Carcass

According to the invention, a method is provided for mounting beads on a tire carcass which is being built on drum, when a relatively inextensible bead must traverse a bump having a greater OD than the ID of the bead. This situation arises when there is an impediment (e.g., the drum support) to installing beads from both ends of a drum. The present invention is also useful for mounting beads to carcasses when there is no problem with bumps. The present invention is particularly well suited to being used in conjunction with a flexible, automatic tire building system 100, such as has been described hereinabove, for placing beads on tire carcasses.

FIG. 4A illustrates a generic tire building drum 408 (compare 308) having an axis 434 (compare 334), a free end 408a (compare 308a) and an opposite end 408b (compare 308b) which is supported by a drum support 430 (compare 330). The drum 408 is illustrated as having a carcass layup area 403 on its surface 402 where a tire carcass (410, described hereinbelow) will be laid up.

Two beads 412L and 412R (collectively referred to as "412") are shown, each bead being held by a respective bead holder (or setter) 422L and 422R (collectively referred to as "422"). In an initial step of the overall tire carcass building process of the present invention, the right-hand bead 412R and associated bead holder 422R are moved into a "park" position on the drum 408, in an area 405 which is preferably beyond the area 403 where the carcass will be laid up (between the area 403 and the drum support 430). The left bead 412L and associated bead holder 422L are shown as being beyond located off the drum 408, axially beyond the free end 408a of the drum 408. At this point, the bead holder 422R can release the bead 412R, and be removed (as described in greater detail hereinbelow), so that the bead 412R remains in the park position on the drum 408. In other words, the bead holder 422R simply deposits the bead 412R on the drum 408. Since the bead has a greater diameter than the drum, and to maintain the bead in a known position and orientation on the drum, any suitable apparatus can be incorporated onto the drum (or drum holder), such as three projections "p" (see FIG. 4B) disposed evenly about the circumference of the drum (or three fingers extending from a face of the drum holder) to hold and support the bead coaxial with the drum in the area 405.

The right-hand bead 412R and bead holder 422R are moved into position on the drum 408, over the free end 408a of the drum 408, in the direction of the drum support 430, before the carcass 410 is laid up on the drum 408 or, at any suitable point in the steps of laying up the carcass 410 which precedes there being bumps (406, described hereinbelow) such as may be caused by inserts (e.g., 306, 318) in the outer surface of the tire carcass 410, and which would impede the bead 412R from being installed from the free end 408a of the drum 408. For example, the bead 412 can be placed on the drum 408 after the inner liner (e.g., 304) is applied. Or, the bead 412 can be placed on the drum 408 after the inner liner (e.g., 304'), inserts (e.g., 306'), and first ply (310') have been applied on a drum (e.g., 308') of a type which has recesses (e.g., 316). The bead 412R is "parked" in this position, which is typically beyond the area 403 of the drum whereupon the carcass 410 will be laid up. In the context of the flexible, automatic tire building system 100, it is preferable that the bead holder 422R is removed once the bead 412R is put in place on the drum 408.

Next, as illustrated in FIG. 4B, a generic carcass 410 is laid up on the drum 408. This generic carcass 410 exhibits two generic bumps 406L and 406R (collectively referred to as "406") such as may be caused by inserts (e.g., 306, 318) in the tire carcass 410. In this step, the right-hand bead 412R remains in the parked position (area 405), supported by the three projections "p". In this step, the left-hand bead 412L and bead holder 422L are shown as still being "off-drum" (in a position which is axially beyond the free end 408a of the drum 408), awaiting a suitable stage in the process of laying up the carcass 410 to be installed on the carcass 410. The bead 412R will be picked up by the bead holder 422R and installed on the carcass when the carcass is substantially completely laid up, as described hereinabove. In this step, the bead 412R is shown as being in the park position, resting on the projections "p", without the bead holder 422R, which has been removed.

Next, as illustrated by FIG. 4C, the bead holder 422R is re-introduced, has picked up the bead 412R, and the bead 412R has been moved from the parked position, towards the free end 408a of the drum 408, onto the carcass 410. As in the previous examples, the bead 412R is located (set into place) adjacent and immediately outboard (to the right of, as viewed) of the bump 406R. The left bead 412L is shown as having been moved with the bead holder 422L from its previous position beyond the free end 408a of the drum 408, towards the opposite end 408b of the drum, onto the carcass 410, so that the bead 412L is located adjacent and immediately outboard (to the left of, as viewed) of the bump 406L.

With the beads 412 in place on the carcass 410, the bead holders 422 may both be removed (as described hereinbelow), and more (additional) tire components can be added to the tire (as may be required by the tire design), and/or additional steps in the formation of a the tire carcass can be performed, such as turning up the turnup ends of the carcass, in a conventional manner. As described in greater detail hereinbelow, with respect to FIGS. 5A and 5B, the bead holders 422 (which have been shown schematically) are segmented so that they can easily be opened up and removed from the drum 408 once the beads 412 are set on the carcass 410. This is also relevant to the aforementioned step of removing the bead holder 422R after depositing the bead 412R in the area 405, as shown and described with respect to FIG. 4A.

An important feature of the invention is that at least one of the beads 412 is moved into position on the drum 408 before the laying up of the carcass 410 substantially prevents (makes difficult or impossible) its installation from the free end 408a of the drum 408. This can be done prior to laying up any component of the carcass, or after some components are laid up, but in any case prior to there being bumps 406 in the carcass which would prevent bead installation.

It should clearly be understood that when describing the process of moving the bead over the drum, that an equivalent result would accrue if the bead were stationary and the drum were moved through the bead.

FIGS. 5A and 5B illustrate a bead holder 522 (compare 422) in a closed and open position, respectively. The bead holder 522 comprises a support (base) 502 and a ring 504. The ring 504 has an inside diameter "d". The ring 504 comprises three segments—a left segment 504a, a middle segment 504b and a right segment 504c. The three segments 504a, 504b and 504c are typically of equal arcuate extent—namely, approximately 120-degrees each. The middle segment 504b is fixed to the support 502. The left and right segments 504a and 504c are pivotally affixed to the middle segment 504b (as shown), or directly to the support 502.

A mechanism 506L is provided for causing the left segment 504a to pivot from its closed position (FIG. 5A) to its open position (FIG. 5B). A mechanism 506R is provided for causing the right segment 504a to pivot from its closed position (FIG. 5A) to its open position (FIG. 5B). In the open position, the distal ends of the left and right segments 504a and 504c are spaced a distance apart "e" which is greater than the diameter (OD) of a tire drum (more particularly, of a carcass being laid up upon the drum), so that it can be removed from the drum simply by raising it (radially, with respect to the drum) off of the drum. This direction for removing the open bead holder 522 from a drum (e.g., 408) having an axis 534 (compare 434) is indicated by the arrow 536.

A plurality of magnets 508 are disposed just inside inner edge of the ring 504. These magnets are for holding a bead 512 (shown only partially, for illustrative clarity) onto the ring 504. The magnets 508 are strong enough to hold the bead 512, but weak enough to let the bead 512 stay in place on a drum, or on a tire carcass being laid up on the drum when the bead holder is removed from the drum.

A bead is typically loaded onto the bead holder "off-line", before the bead holder is brought into position with the drum, as discussed hereinabove (with respect to bead loader 140).

The Bead Loading System

In FIGS. 1A, 1B, 1C and 1D, a flexible, automatic tire building system 100 is described that includes a first stage tire building system 102, a carcass transfer device 104 and a second stage building machine 106. A plurality of tire building drums 108 were shown.

As mentioned hereinabove, FIG. 1D illustrates an overhead structure 150 which incorporates a bead loading and bead setting system 152, and a carcass transfer apparatus 154. The overhead structure 150 includes a plurality of support columns 156, disposed to provide space for the working stations 112a, 112b, 112c, 112d, as shown in FIG. 1A. A rail 158 is mounted to the support columns 156 and extends from the first work station to a distance past the last work station 112d. The bead loading system 152 includes a pair of bead loaders 162a (right, as viewed) and 162b (left, as viewed) that move along the rail 158. The bead loading system 152a also includes a bead loader 140 for mounting the beads onto the bead loaders 162a and 162b. The bead loaders 162a and 162b move along the rail 158 and place the beads onto the building drums 108 and also set the beads onto the building drums 108 moving through the first stage building system 102.

A particular example of a pair of bead holders 422R and 422L, corresponding to the bead loaders 162a and 162b, placing a pair of beads 412R and 412R onto a carcass 410 on a building drum 408 was discussed in detail with regard to FIGS. 4A–4C. FIGS. 5A and 5B illustrated an exemplary bead holder (or setter) 522.

FIG. 6A illustrates a bead setter 600 of a bead loading system. The bead setter 600 comprises a carrier 602 and a bead holder 622. FIG. 6B illustrates two bead loaders 600L and 600R, comprising two carriers 602L and 602R and two bead holders 622, respectively, such as would be appropriate for loading two beads (e.g., 412L and 412R) on a tire carcass (e.g., 410). The bead loading system comprises a horizontal rail 658 (or track, compare 158) which is mounted to support columns (not shown, see 156) and which extends from the first work station 112a (not shown, see FIG. 1D) to a distance past the last work station 112d (not shown, see FIG. 1D). The rail 658 is U-shaped, and is fixed (it doesn't move).

The carrier 602 comprises a elongate support member 604 having two ends 604a and 604b, and which is disposed atop the rail 658. A forcer coil 656 extends essentially from the one end 604a of the support member 604 into a channel formed by the U-shaped rail 658. The forcer coil 656 is free to move within the rail 658, so as to impart motion, in a first degree of freedom, to the carrier support member 604. (This degree of freedom is indicated in FIG. 6B by the arrows 640.) The overhead rail 658 and forcer coil 656 form a "linear motor", such as the Bearingless Linear Motor ("BLM") system which is commercially available from Aerotech (Pittsburgh, Pa.). Like a ballscrew system, the BLM forcer coil 656 must be supported by a linear bearing system, which is omitted from the illustrations for the sake of illustrative clarity. Generally, any mechanical system for moving the carrier 602 back and forth along the length of any suitable rail/track spanning the workstations would be useful for practicing the present invention.

A bead holder 622 (compare 522) hangs by a vertical rail 624 from the end 604b of the support member 604, so as to be under the overhead rail 658. The bead holder 622 comprises a support 626 (compare 502) and a ring 628 (compare 504). The support 626 is constructed in a manner that the bead holder 622 can be moved up and down the vertical rail 624, as indicated by the arrow 620, by a suitable mechanism (not shown). This is a second degree of freedom. It is within the scope of the invention that a mechanism is provided so that the bead holder 622 can also be moved in and out, as indicated by the arrow 630 (FIG. 6A), so as to have a third degree of freedom.

The BLM system incorporates a commercial position transducer, such as a linear encoder (either enclosed type, or tape scale/read head type), to provide an indication of the forcer coil position to a motion controller. One of ordinary skill in the art will recognize this as conventional servo feedback control system technology, and the application will determine the resolution required. For purposes of describing the present invention, a tape scale 650 is shown on an external surface of the overhead rail 658. The tape scale 650 is essentially a series of reference marks 652 (best viewed in FIG. 6B), spaced apart at a desired resolution along the length of the rail 658. A read head 654 (best viewed in FIG. 6A) is affixed to the vertical rail 624 so as to be able to read the reference marks 652 on the rail 658, thereby indicating the position of the carrier 602 along the length of the horizontal rail 658. Signals generated by the read head 654 are provided to a controller (not shown) to indicate and control the positions of each of the two carriers 602L and 602R.

FIG. 6B shows two carriers 602, a left-hand carrier 602L and a right-hand carrier 602R. Each carrier 602L and 602R has a bead holder 622L and 622R associated therewith, suspended by a vertical bar 624L and 624R, respectively. Each bead holder 622 has a first degree of freedom as Indicated by the arrow 640 to move along the track 658, from workstation-to-workstation, and has a second degree of freedom as indicated by the arrow 620 to move up and down (typically radially, with respect to a first stage tire building drum), and optionally has a third degree of freedom as indicated by the arrow 630 (see FIG. 6A) for moving back and forth (typically, towards or away from a server 126).

The combination of a carrier 602 and a bead holder 622 is referred to as a "bead setter" 600. The bead loading system 152 of the present invention allows two bead loaders 600, as described hereinabove, to travel along the length of the system and place beads on the drums located at any workstation (e.g., 112a–112d) that is within its range of travel. The structural beam 658 (158) is elevated across, and extends the length of, the length of the workstations. The carriers 622L and 622R are mounted to the rail with bearings so that they can quickly move along the length of the beam, from one end of the beam to the other.

Third Carrier/Carcass Transfer Apparatus

A third carrier, comparable to the carrier 602, may be provided on the horizontal rail 658, as shown in FIG. 1D, having a carcass transfer apparatus 154 (rather than a bead holder 622) including a grab ring device 166 that slides onto and removes the finished tire carcass from the building drum 108 (e.g., 408) in working station 112d. The grab ring device 166 then moves toward the carcass transfer device 104 where the tread and belt package are placed over the tire carcass. Therefore, in the automatic tire manufacturing system 100, three carriers hang from the horizontal rail. The position of each carrier can be tracked by means of the tape scale 650 (with reference marks 652) and read head 654.

Sequence of Operations

In a typical sequence of operation, after a completed carcass is removed from a drum (408) at the last work station (112d), one of the two beads (e.g., 412R) for a subsequent carcass to be laid up on the drum, can be installed by a bead setter 600, onto the drum, in the parked position (e.g., 405). The bead then stays with the drum as the AGV 110 moves the drum around the work path 114 to the first work station 112a where a first of a sequence of steps in laying up the subsequent carcass is performed, as described hereinabove. As the drum progresses from station-to-station, the carcass is built up. At a selected one of the work stations (e.g., 412a-412d), for example at the third work station (112c), the bead holder 422R can be inserted in its open position (see FIG. 5B) onto the drum, closed, and caused to pick up the first bead 412R (e.g., magnets 508) and move the first bead (412R) into position on the carcass (see FIG. 4C). At the same time, the second bead (412L) which is being carried by the second bead holder (422L) can be moved into position on the carcass (see FIG. 4C). Then, as described hereinabove, the bead holders can be removed, and carried away by their respective carriers, for performing similar operations on subsequent drums.

Initializing The System

In the context of three carriers (left, middle, right), the system may be initialized, at startup, by:
  a. moving the right carrier slowly to the right, to the end of travel;
  b. then, moving the right carrier slowly to the left, to pick up a first reference mark (e.g., 652);
  c. then, moving the left carrier slowly to the end of travel, then reversing direction and picking up a second reference mark; and
  d. moving the middle carrier to the right, to an anti-collision apparatus (not shown), then slowly moving it to the left, to its own (third) reference mark.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. A method for mounting two beads on a tire carcass which is being laid up on a tire building drum, wherein:
  the drum has a free end and an opposite end which is supported by a drum support; and
  the drum has a first area on its surface where the tire carcass will be laid up;
  the method comprising:

disposing a first bead on the drum in a second area which is between the first area and the drum support with a first bead holder for moving it into position in the second area; and after the carcass is at a suitable stage in being laid up, picking up the first bead from the second area with the first bead holder and mounting the first bead on the carcass.

2. Method, according to claim 1, further comprising:

disposing the first bead in the second area before the carcass is laid up on the drum.

3. Method, according to claim 1, further comprising:

disposing the first bead in the second area at any point in the steps of laying up the carcass which precedes there being bumps in the outer surface of the tire carcass.

4. Method, according to claim 1, further comprising:

disposing the first bead in the second area after an inner liner of the carcass has been applied on the first area of the drum.

5. Method, according to claim 1, further comprising:

disposing the first bead in the second area after an inner liner, inserts, and first ply of the carcass have been applied on the first area of the drum.

6. Method, according to claim 1, further comprising:

after disposing the first bead in the second area, laying up the carcass on the drum.

7. Method, according to claim 6, further comprising:

after laying up the carcass, moving the first bead from the second area onto the carcass.

8. Method, according to claim 6, further comprising:

after laying up the carcass, moving a second bead from beyond the free end of the drum onto the carcass.

9. Method, according to claim 1, further comprising:

after the carcass is laid up on the drum and the first bead has been moved into position onto the carcass, removing the first bead holder.

10. Method, according to claim 9, further comprising:

after removing the first bead holder, performing additional steps in the formation of the carcass.

11. Method, according to claim 1, wherein:

at least one bead is moved into position on the drum before the laying up of the carcass substantially prevents installation of the at least one bead.

12. Method, according to claim 1, further comprising: installing both beads from the free end of the drum.

13. Method, according to claim 1, further comprising:

releasing the first bead after disposing it in the second area and then removing the first bead holder.

14. Method, according to claim 1, wherein:

the first bead is deposited in the second area immediately after a completed carcass is removed from the drum.

15. Method, according to claim 1, further comprising:

after the carcass is at a suitable stage in being laid up, using a second bead holder for mounting a second bead on the carcass.

16. A method of loading beads on a carcass in an automatic tire building system comprising a sequence of work stations and drums advancing from station-to-station for laying up the carcass, the method comprising:

once a completed carcass is removed from a drum, a first bead for a subsequent carcass to be laid up on the drum is deposited on the drum by a first bead holder and the first bead remains with the drum as the drum cycles back to a first station in the sequence of work stations to commence laying up the subsequent carcass on the drum; and at a subsequent work station in the sequence of work stations, the first bead is picked up by the first bead holder and set on the carcass.

17. Method, according to claim 16, further comprising:

at a subsequent work station in the sequence of work stations, a second bead is also set on the carcass.

18. Method, according to claim 17, wherein:

the first and second beads are set on the carcass by respective first and second bead holders which are suspended from an overhead rail.

19. Method, according to claim 18, further comprising:

suspending a carcass transfer device from the overhead rail.

20. Method, according to claim 16, wherein the drum has a first area on its surface where the tire carcass will be laid up, the method further comprising:

depositing the first bead on the drum in a second area which is between the first area and a drum support.

* * * * *